(12) United States Patent
Horvatich

(10) Patent No.: US 10,213,909 B2
(45) Date of Patent: Feb. 26, 2019

(54) VEHICLE DRIVELINE SERVICING APPARATUS AND METHOD

(71) Applicant: GM GLOBAL TECHNOLOGY OPERATIONS LLC, Detroit, MI (US)

(72) Inventor: Robert M. Horvatich, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 290 days.

(21) Appl. No.: 15/271,919

(22) Filed: Sep. 21, 2016

(65) Prior Publication Data

US 2018/0079059 A1    Mar. 22, 2018

(51) Int. Cl.
| | | |
|---|---|---|
| *B25B 27/00* | (2006.01) | |
| *B60S 5/00* | (2006.01) | |
| *B25B 7/02* | (2006.01) | |
| *B25B 7/08* | (2006.01) | |
| *B25B 7/14* | (2006.01) | |

(52) U.S. Cl.
CPC ............ *B25B 27/0035* (2013.01); *B25B 7/02* (2013.01); *B25B 7/08* (2013.01); *B25B 7/14* (2013.01); *B60S 5/00* (2013.01)

(58) Field of Classification Search
CPC ......... B25B 27/0035; B25B 7/02; B25B 7/08; B25B 7/123; B25B 7/14; B60S 5/00
See application file for complete search history.

(56) References Cited

U.S. PATENT DOCUMENTS

| | | | | |
|---|---|---|---|---|
| 93,179 | A * | 8/1869 | Crain ...................... | B25B 7/123 81/363 |
| 519,550 | A * | 5/1894 | Riordan .................... | B25B 7/22 7/130 |
| 1,612,474 | A * | 12/1926 | Strain ....................... | B25B 7/02 29/270 |
| 1,641,152 | A * | 9/1927 | Burleigh .................. | B67B 7/18 81/3.44 |
| 2,277,081 | A * | 3/1942 | De Lillo ................... | B25B 7/02 140/106 |
| 2,495,308 | A * | 1/1950 | Amigone ................ | B67B 7/066 81/186 |
| 2,630,729 | A * | 3/1953 | Arner ........................ | B25B 7/02 81/13 |
| 2,642,766 | A * | 6/1953 | Elsberg ..................... | B25B 5/10 269/246 |
| 2,779,224 | A * | 1/1957 | Coggburn ................. | B25F 1/00 7/126 |

(Continued)

FOREIGN PATENT DOCUMENTS

DE        3829311 A1 *  3/1990  ............... B25B 7/02

*Primary Examiner* — Jacob J Cigna

(57) ABSTRACT

An apparatus to service the driveline of a vehicle is presented. The apparatus includes two members, a pivot element, and a bridge lock. The members each have an elongated handle segment and a jaw segment. The pivot element is configured to pivotally connect both members together near the jaw segments. The bridge lock is configured to be movably positioned along the handle segments. The jaw segments combine to define a profile which is adapted to secure to the splined coupling interface of a vehicle propeller shaft. The bridge lock is adapted to provide holding pressure to the handle segments, so as to lock the jaw segments when secured to the splined coupling interface.

18 Claims, 3 Drawing Sheets

(56) References Cited

U.S. PATENT DOCUMENTS

| | | | | | |
|---|---|---|---|---|---|
| 3,585,704 | A | * | 6/1971 | Schroeder | B25B 7/02 269/2 |
| 4,318,316 | A | * | 3/1982 | Guilliams | B25B 7/02 81/367 |
| 4,763,394 | A | * | 8/1988 | Decato | B23P 19/02 29/252 |
| 4,889,021 | A | * | 12/1989 | Morrison | B25B 7/00 81/325 |
| 5,007,312 | A | * | 4/1991 | Bailey | B25B 7/02 269/296 |
| D371,287 | S | * | 7/1996 | Gilbert, Jr. | D8/27 |
| 5,531,141 | A | * | 7/1996 | Gilbert, Jr. | B25B 7/02 81/424.5 |
| 5,896,886 | A | * | 4/1999 | Wendt | B25B 7/02 123/196 A |
| 6,220,126 | B1 | * | 4/2001 | Domenge | B25B 7/04 81/418 |
| 2004/0000220 | A1 | * | 1/2004 | Walsh | B25B 7/14 81/324 |

\* cited by examiner

VEHICLE DRIVELINE SERVICING APPARATUS AND METHOD

INTRODUCTION

In general, common tools used to service a vehicle's propeller shaft are known as being slow to assemble and use, curtail productivity, and be cumbersome to prepare. As a result, at the expense of following proper servicing procedures, technicians often elect against using the servicing tool by creating and implementing their own servicing methodologies. These alternative methods, however, have been known to cause damage to the vehicle propeller shaft as well as injury to the technician. A tool that allows for safe and effective use, easy preparation, and reduces the likelihood of costly vehicle damage is therefore desired.

SUMMARY

An apparatus to service the driveline of a vehicle is presented. The apparatus includes two members, a pivot element, and a bridge lock. The members each have an elongated handle segment and a jaw segment. The pivot element is configured to pivotally connect both members together near the jaw segments. The bridge lock is configured to be movably positioned along the handle segments. The jaw segments combine to define a profile which is adapted to secure to the splined coupling interface of a vehicle propeller shaft. The bridge lock is adapted to provide holding pressure to the handle segments, so as to lock the jaw segments when secured to the splined coupling interface.

The handle segments may combine to define a taper geometry that enables the holding pressure between the handle segments and bridge lock. The taper geometry may be six degrees. Each jaw segment may include a ridge which is adapted to interlock with the groove of the splined coupling interface. The ridge may correspond with the width and circumference of the splined coupling interface groove. The pivot element may include a flange and recess combination. The bridge lock may be defined by two impact pegs inserted into two body segments. The servicing apparatus may be constructed from metallic material.

A method to service the driveline of a vehicle is also herein presented. The method includes: providing a vehicle propeller shaft, wherein the propeller shaft comprises a splined coupling interface with a groove; providing a servicing apparatus (as discussed above); spreading the servicing apparatus jaw segments via the handle segments and pivot element; securing the servicing apparatus to the splined coupling interface by clamping the jaw segments via the handle segments and pivot element; and moving the bridge lock along the handle segments so as to provide substantial holding pressure to lock the jaw segments.

The method may further include disengaging the propeller shaft from the vehicle power takeoff unit (PTU)/rear drive module (RDM) through implementation of the servicing apparatus. The method may further include installing the propeller shaft into the vehicle power takeoff unit (PTU)/rear drive module (RDM) through implementation of the servicing apparatus.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the exemplary aspects of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 3:
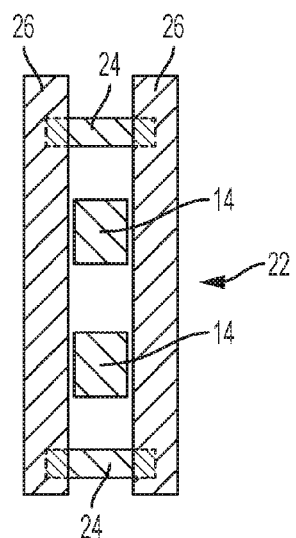
FIG. 3 shows a side view of the bridge lock component of the servicing apparatus of FIG. 1.
Figure 4:
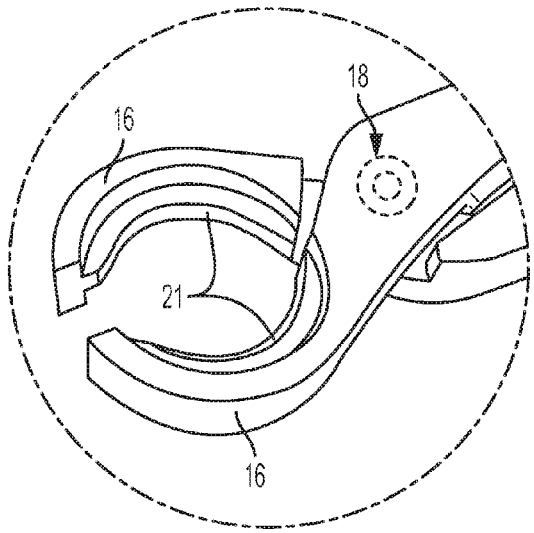
FIG. 4 shows a view of the jaw segments of the servicing apparatus of FIG. 1.

FIGS. 1 through 4 show a servicing apparatus 10 that may be used to service a vehicle driveline (as shown in FIG. 4). The servicing apparatus 10 includes two members 12 each of which have an elongated handle segment 14 and a jaw segment 16. Connecting the members 12 is a pivot element 18 in close proximity to each jaw segment 16 (e.g., 1 centimeter from the distal side of the jaw segment). As such, when properly connected, force applied to separate handle segments 14 will be leveraged and multiplied when reacted against jaw segments 16. In this embodiment, the pivot element 18 is constructed of a pin (i.e., a flange with a variable diameter) joined to one member 12 and which can interlock into and rotate within a recess in the opposite member 12. However, the pivot element 18 may be embodied as a nut and bolt assembly. The pivot element 18 may moreover be configured to shift its position to allow for the ability of jaw segments 16 clamping onto various components of propeller shafts (e.g., splined coupling interfaces of different diameters). This may be done through the shape of the recess. It should be appreciated that one or both handle segments 14 may include an orifice (not shown) to allow for an additional impacting tool (e.g., slide hammer) to be fastened to apparatus 10.

When the jaw segments 16 are clamped together, handle segments 14 combine to define a taper geometry 20. A bridge lock 22 is positioned along the elongated bodies of handle segments 14 and can move freely up and down the handle segments 14 (i.e., closer to and away from the jaw segments 16). As a result, due to the tapered geometry 20 of the handle segments 14, variable pressure is applied as bridge lock 22 moves down and along the handle segments 14. With reference to FIG. 3, the bridge lock 22 is constructed from two impact pegs 24 that are inserted at each end of two bridge lock body segments 26. As follows, impact pegs 24 push against the external side of both handle segments 14 which applies the pressure and thus restricts the handle segments 14 from further separating and enlarging tapered geometry 20. It should be noted the geometry of the handle segments encompasses the spectrum of tapers identified as locking taper geometries. For example, the taper geometry may be six degrees (i.e., a six degree angle between both handle segments 14). The taper geometry may, however, be more or less than six degrees.

With reference to FIG. 4, a ridge 21 is located on the inner circumferentially-shaped side of both jaw segments 16. By design, the ridge 21 segment on both jaw segments 16 combine to define a profile which interlocks with the groove of a splined coupling interface (discussed below). In addition, all or certain components of servicing apparatus 10 may be constructed from metallic material such as, but not limited to, steel or aluminum.

Figure 5:
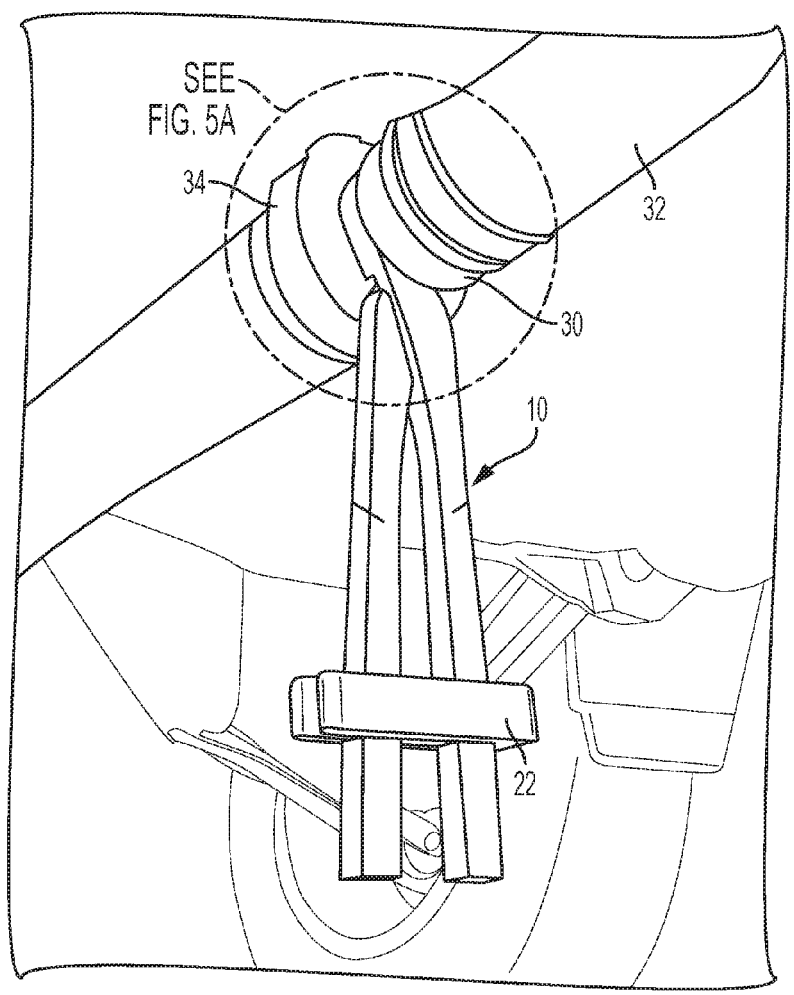
FIG. 5 shows the servicing apparatus of FIG. 1 being implemented in a corresponding operating environment.
Figure 5A:
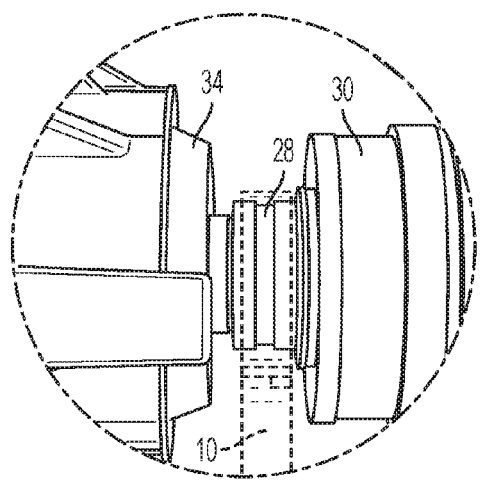
FIG. 5A shows a view of a splined coupling interface from the operating environment of FIG. 5.

As shown in FIGS. 5 and 5A, servicing apparatus 10 secures to the groove 28 of a splined coupling interface 30, which is generally located at one end of a vehicle propeller shaft 32. To lock ridge 21 into groove 28, bridge lock 22 is applied to push against handle segments 14. The splined coupling interface 30 connects with the vehicle's power takeoff unit (PTU)/rear drive module (RDM) 34 (depending on the vehicle model) and helps to make up a section of the vehicle drive shaft. As can be seen, ridge 21 corresponds with the width and circumference of groove 28.

Figure 1:
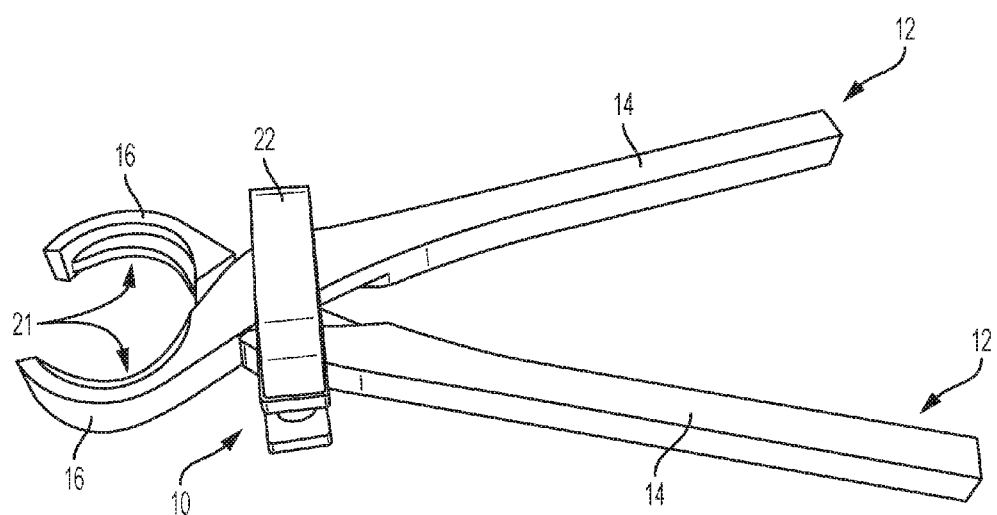
FIG. 1 shows an embodiment of a servicing apparatus.
Figure 2:
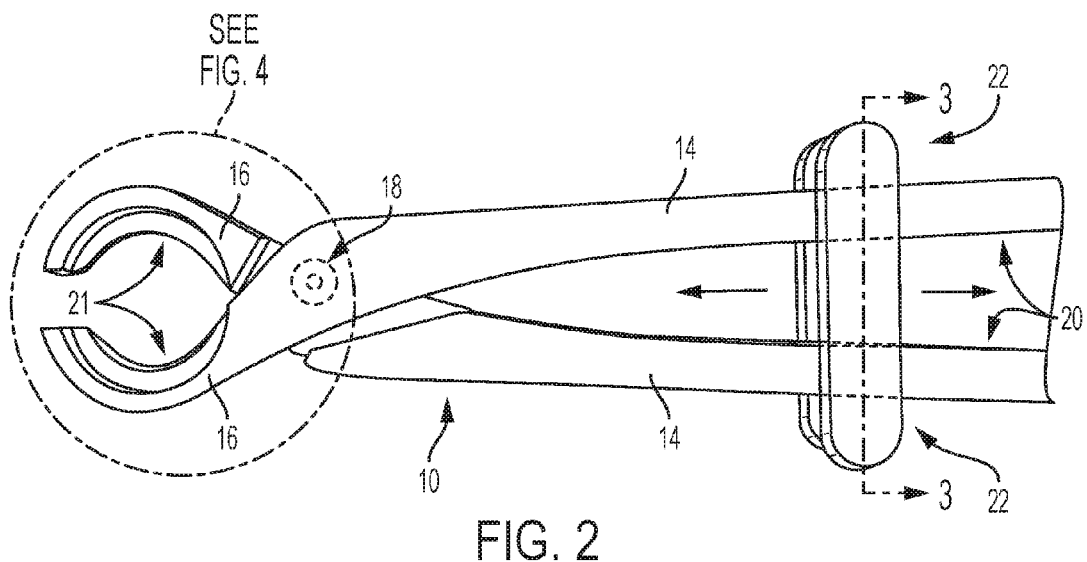
FIG. 2 shows an aspect of the servicing apparatus of FIG. 1.

As should be understood by referencing the drawings, to operate servicing apparatus 10, a technician (not shown) would first spread the jaw segments 16 apart by pulling the handle segments 14 away from each other (see FIG. 1). The technician would then position the jaw segments 16 around the splined coupling interface 30 (or some other shaft component), aligning the ridge 21 with groove 28. Once alignment is complete, the technician would then push the handle segments 14 together to clamp the jaw segments 16 down unto the splined coupling interface 30 (or another shaft component), such that the ridge 21 interlocks into groove 28. The servicing apparatus 10 is thus secured unto the splined coupling interface 30 and propeller shaft 32. To lock servicing apparatus 10 in place, the technician would move bridge lock 22 along the handle segments 14 until substantial holding pressure has been created and bridge lock 22 appears to be locked into place. When the drive shaft is complete, the technician can freely move the propeller shaft 32 via the locked servicing apparatus 10 and in turn disengage the propeller shaft 32 from the PTU/RDM 34. Conversely, the technician can use the locked servicing apparatus 10 to move the propeller shaft 32 freely to effectively install the shaft onto the PTU/RDM 34. Once the propeller shaft 32 is installed/disengaged, a technician is simply required to move bridge lock 22 up and along the handle segments 14 until the holding pressure is released and subsequently unclamp the jaw segments 16 from the spline coupling interface 30.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An apparatus to service the driveline of a vehicle, the apparatus comprises:
    two members each having an elongated handle segment and a jaw segment;
    a pivot element configured to pivotally connect both members together;
    a bridge lock configured to movably position along the handle segments;
    the jaw segments combine to define a profile adapted to clamp around an entire circumference of a portion of a splined coupling interface of a vehicle propeller shaft so as to secure to the vehicle propeller shaft;
    the bridge lock is adapted to provide holding pressure to the handle segments so as to lock the jaw segments when secured to the propeller shaft; and
    wherein an inner circumferentially-shaped side of each jaw segment comprises a ridge that is thinner than the jaw segment and being adapted to interlock with a groove of the splined coupling interface when the jaw segments have clamped around the circumference of the portion of the splined coupling interface.

2. The apparatus of claim 1, wherein the ridge corresponds with the width of the splined coupling interface groove and interlocks around the circumference of the splined coupling interface groove.

3. The apparatus of claim 1, wherein the bridge lock is defined by two impact pegs inserted into two body segments.

4. The apparatus of claim 1, wherein the pivot element comprises a pin and recess combination.

5. The apparatus of claim 1, wherein the servicing apparatus is constructed from metallic material.

6. The apparatus of claim 1, wherein the handle segments combine to define a taper geometry that enables the holding pressure between the handle segments and bridge lock.

7. The apparatus of claim 6, wherein the taper geometry is six degrees.

8. A system to service the driveline of a vehicle, the system comprises:
    a vehicle propeller shaft, the propeller shaft comprises:
        a splined coupling interface with a groove;
    a servicing apparatus, the servicing apparatus comprises:
        two members each having an elongated handle segment and a jaw segment;
        a pivot element pivotally connecting both members together to define a plier;
        the jaw segments combine to define a profile adapted to clamp around an entire circumference of a portion of the splined coupling interface so as to secure to the vehicle propeller shaft, an inner circumferentially-shaped side of each jaw segment comprises a ridge that is thinner than the jaw segment and being adapted to interlock with the groove of the splined coupling interface when the jaw segments have clamped around the circumference of the portion of the splined coupling interface;

a bridge lock movably positioned along the handle segments, the bridge lock adapted to provide holding pressure to the handle segments so as to lock the jaw segments when secured to the splined coupling interface; and the handle segments combine to define a taper geometry that enables the holding pressure between the handle segments and bridge lock.

9. The system of claim 8, wherein the taper geometry is six degrees.

10. The system of claim 8, wherein the ridge corresponds with the width of the splined coupling interface groove and interlocks around the circumference of the splined coupling interface groove.

11. The system of claim 8, wherein the bridge lock is defined by two impact pegs inserted into two body segments.

12. The system of claim 8, wherein the servicing apparatus is constructed from metallic material.

13. A method to service the driveline of a vehicle, the method comprises:

providing a vehicle propeller shaft, wherein the propeller shaft comprises a splined coupling interface with a groove;

providing a servicing apparatus, wherein the servicing apparatus comprises:

two members each having an elongated handle segment and a jaw segment;

a pivot element pivotally connecting both members together near the jaw segments;

the jaw segments combine to define a profile adapted to clamp around an entire circumference of a portion of the splined coupling interface of the vehicle propeller shaft;

wherein each jaw segment comprises a ridge that is thinner than the jaw segment and being adapted to interlock with the groove of the splined coupling interface; and a bridge lock movably positioned along the handle segments, the bridge lock adapted to provide holding pressure to the handle segments so as to lock the jaw segments when secured to the splined coupling interface;

spreading the jaw segments via the handle segments and pivot element;

securing the servicing apparatus to the splined coupling interface by clamping the jaw segments via the handle segments and pivot element; and moving the bridge lock along the handle segments so as to provide holding pressure to lock the jaw segments.

14. The method of claim 13, further comprising disengaging the propeller shaft from the vehicle power takeoff unit (PTU)/rear drive module (RDM) through implementation of the servicing apparatus.

15. The method of claim 13, further comprising installing the propeller shaft into the vehicle power takeoff unit (PTU)/rear drive module (RDM) through implementation of the servicing apparatus.

16. The method of claim 13, wherein the handle segments combine to define a taper geometry that enables the holding pressure between the handle segments and bridge lock.

17. The method of claim 13, wherein the ridge corresponds with the width and circumference of the splined coupling interface groove.

18. The method of claim 13, wherein the bridge lock is defined by two impact pegs inserted into two body segments.

* * * * *